(12) United States Patent
Nukui et al.

(10) Patent No.: US 6,433,928 B1
(45) Date of Patent: Aug. 13, 2002

(54) OPTICAL AMPLIFIER, OPTICAL AMPLIFICATION APPARATUS, AND OPTICAL AMPLIFICATION METHOD

(75) Inventors: Katsuya Nukui; Yoshio Tashiro; Shu Namiki, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/592,858

(22) Filed: Jun. 12, 2000

Related U.S. Application Data

(63) Continuation of application No. PCT/JP99/05611, filed on Oct. 12, 1999.

(30) Foreign Application Priority Data

Oct. 14, 1998 (JP) .......................................... 10-292139

(51) Int. Cl.[7] .............................. H01S 3/02; H01S 3/092
(52) U.S. Cl. ........................... 359/345; 359/341; 372/6; 372/70
(58) Field of Search ................................ 359/134, 160, 359/341, 345; 372/6, 69, 70, 72

(56) References Cited

U.S. PATENT DOCUMENTS

| | | | | | |
|---|---|---|---|---|---|
| 3,577,095 A | * | 5/1971 | Benner | .......................... | 372/70 |
| 3,646,474 A | * | 2/1972 | Segre | ........................... | 372/70 |
| 3,663,893 A | * | 5/1972 | Ostermayer | ................... | 372/70 |
| 4,001,704 A | * | 1/1977 | Danielmeyer et al. | ...... | 359/345 |
| 4,006,431 A | * | 2/1977 | Ross | ........................... | 372/70 |
| 4,383,318 A | * | 5/1983 | Barry et al. | ................... | 372/6 |
| 6,055,260 A | * | 4/2000 | Byren et al. | .................. | 372/72 |

FOREIGN PATENT DOCUMENTS

JP          55-95383        *  7/2000

OTHER PUBLICATIONS

Wu Et Al. Appl. Phys. Letters, vol. 53, No. 3, Jan. 15, 1990, pp 221–223.*

Perera Et Al, ACOFT '96, Australia, pp 313–316; Abstract Only Herewith, Dec. 4, 1996.*

Bloues Et Al, Conf. An Laser & Lens Otpics, vol. 6, pp 104–105, Abstract Only Herewith, May 8, 1995.*

* cited by examiner

*Primary Examiner*—Nelson Moskowitz
(74) *Attorney, Agent, or Firm*—Oblon, Spivak, McClelland, Maier & Neustadt, P.C.

(57) ABSTRACT

In an optical amplifier, a pumping source unit 4 is positioned on a surface formed on or adjacent to one X—X of focal axes of an elliptical cylinder or an elliptical cone mainly made of $SiO_2$-glass or crystal, and an amplifying medium 3 is positioned on or adjacent to the other focal axis Y—Y, whereby, on the basis of a geometrical feature in which light emitted from a light source positioned on one of foci of an ellipse is always focused on the other focus thereof, the pumping lights are inputted to the amplifying medium efficiently.

2 Claims, 10 Drawing Sheets

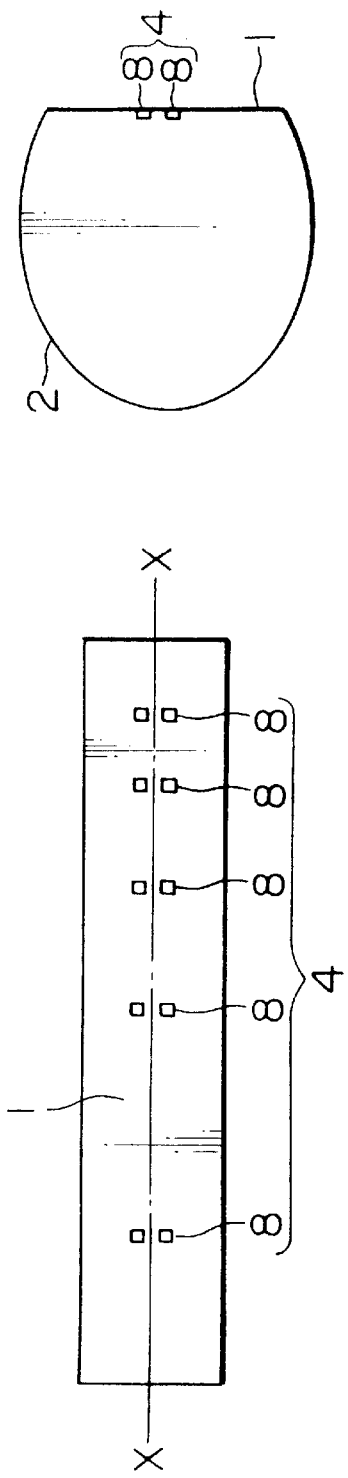
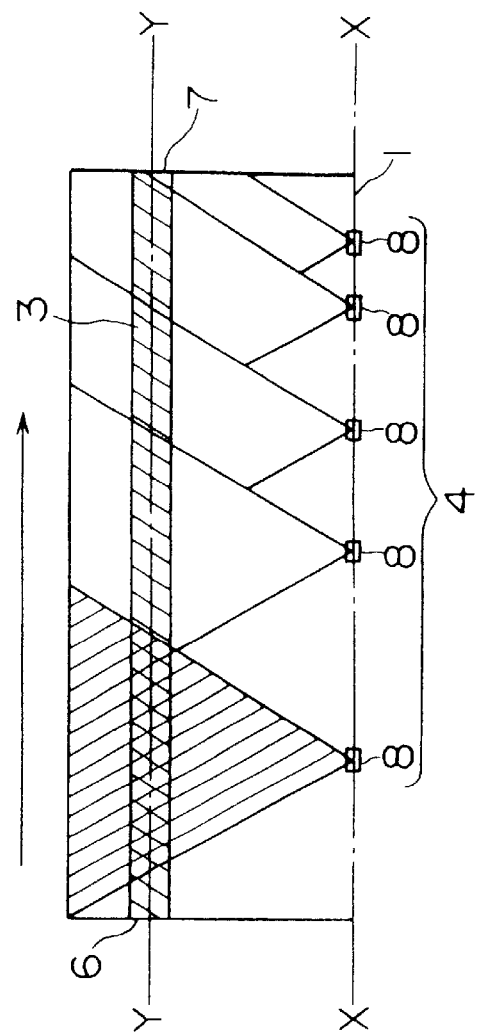
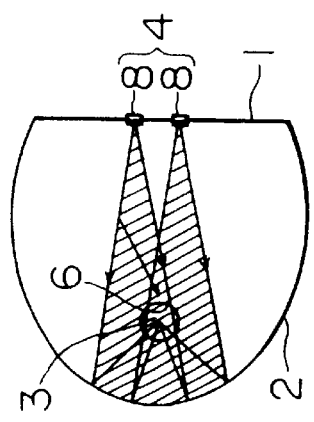
FIG. 3A
FIG. 3B
FIG. 3C

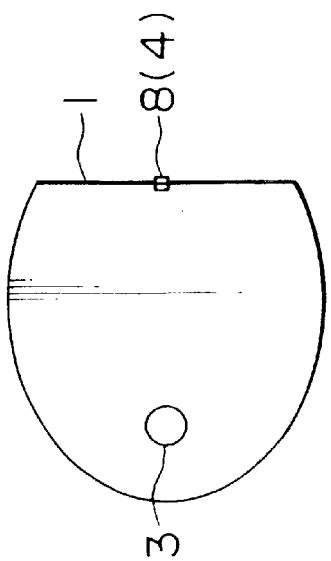
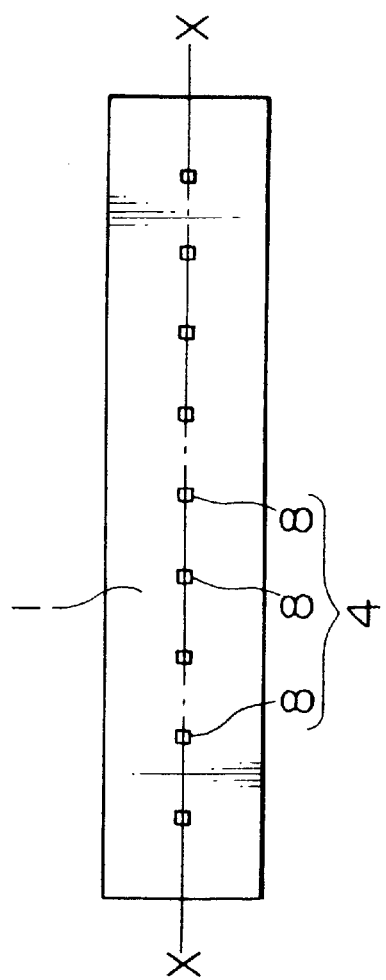
FIG. 4B
FIG. 4A

OPTICAL AMPLIFIER, OPTICAL AMPLIFICATION APPARATUS, AND OPTICAL AMPLIFICATION METHOD This application is a continuation of PCT/P99/05611 filed Oct. 12, 1999

BACKGROUND OF THE INVENTION

1. Field of the Invention

The present invention relates to an optical amplifier, an optical amplification apparatus using such an optical amplifier, and an optical amplification method used in such an optical amplifier and such an optical amplification apparatus. The present invention is suitable to be applied to various field in which light having high output is required, particularly, fields such as optical fiber communication, satellite-to-satellite communication and the like in which high output optical signal is required, a laser marker field, medical and biological fields to which non-linear optics are applied, and a semiconductor manufacturing field.

2. Related Background Art

In the past, an electronic repeater having 3R (reshaping, regenerating and retiming) functions has been used for amplifying an optical signal. However, when an optical signal subjected to wavelength-division-multiplexion for achieving large capacity is amplified by the electronic repeater having 3R function, since it is required that combined light be once divided and the divided lights be amplified and then are combined again, the system becomes very complicated and expensive. Further, when optical signal is transferred at a very high speed, in the electronic repeater having 3R functions, if the speed of the optical signal is changed (for example, changed from 10 MHz to 10 GHz), the electronic repeater having 3R functions itself must be changed.

Thus, as large capacity and high speed long distance communication has been developed, an optical fiber amplifier has been proposed as an amplifier for solving the problems regarding the electronic repeater having 3R functions. As shown in FIG. 9A, in the optical fiber amplifier, when optical signal having a single mode is inputted to a single mode fiber A and a single mode pumping light (laser beam) generated from a pumping source (semiconductor laser) B is combined with the optical signal by a wave combining unit C, the combined light is transferred to an optical amplifier fiber D, where amplifying medium included in the optical amplifier fiber D is pumped by the pumping light, with the result that the optical signal is subjected to optical amplification by stimulated emission.

In order to give higher output to the optical signal by the said optical fiber amplifier, a high output pumping source must be used to input high output pumping light to the amplifying medium. However, the pumping light outputted from the single pumping source has limitation, as shown in FIG. 9B, a plurality of pumping sources B are prepared, and pumping lights from the respective pumping sources B are combined together by wave combining units E to obtain high output, and the combined pumping light is combined with the optical signal by a wave combining unit C.

An optical signal amplifying method utilizing the optical fiber amplifier shown in FIG. 9A has the following disadvantage. That is to say, size of a waveguide is limited to propagate the optical signal in a single mode. Namely, it allows a propose multi mode where transit signal is scramble to multi mode. On the other hand, if the waveguide is narrow, light power density is increased as the optical signal is amplified, thereby increasing distortion of the optical signal due to non-linear effect. After all, in the optical fiber amplifier in which the amplifying medium is included in the waveguide, the optical signal cannot be amplified more than a certain limit output.

An optical signal amplifying method utilizing the optical fiber amplifier shown in FIG. 9B has the following disadvantage. That is to say, when the pumping lights from the plurality of pumping sources are combined steppingly to obtain the pumping light having high output, energy loss generated each wave combination is increasingly accumulated, with the result that many parts are required for achieving the high output. Thus, the cost is increased and high energy is required, and, in actual, it is difficult to obtain the pumping light having high output greater than 2 Watts.

SUMMARY OF THE INVENTION

Therefore, an object of the present invention is to provide a high output optical amplifier in which distortion property and energy loss can be reduced as less as possible, and an optical amplification apparatus using such an optical amplifier, and an optical amplification method used in such an optical amplifier and such an optical amplification apparatus.

The present invention aims to achieve the above object by utilizing a geometrical feature in which light emitted from a light source positioned on one of foci of an ellipse is always focused on the other focus thereof. A light collecting technique such a geometrical feature has already been used on a solid-state laser. More specifically, as shown in FIG. 10, an amplifying medium (ruby crystal) G is positioned on one of focal axes of an elliptical cylindrical mirror F and a flash lamp H (to which an electric power is supplied from a power supply J) is positioned on the other focal axis thereof so that light outputted from the flash lamp H is effectively incident on the amplifying medium G in such a manner that the incident light is resonated in the amplifying medium G to increase the output above a predetermined threshold value.

Now, the present invention will be described more concretely.

According to a first aspect of the present invention, there is provided an optical amplifier comprising a substrate having a surface disposed on or adjacent to a focal axis passing through one of foci of an elliptical cylinder or an elliptical cone mainly made of $SiO_2$-glass or crystal and extending in an optical signal propagating direction, an amplifying medium disposed on or adjacent to the other focal axis of the substrate, and a pumping source unit disposed on or adjacent to the surface of the substrate.

According to a second aspect of the present invention, in the optical amplifier according to the first aspect, reflection coating for reflecting pumping light is applied to surfaces other than a pumping light input inlet and both end faces of the amplifying medium which are optical signal input and output end faces, among outer surfaces of the substrate, and films capable of reflecting the pumping light and permitting passage of the optical signal are coated on the both end faces of the amplifying medium.

According to a third aspect of the present invention, in the optical amplifier according to the first or second aspect, the pumping source unit includes a plurality of pumping sources, and pumping density of the amplifying medium can be adjusted and controlled by changing distances between the pumping sources or by using pumping sources having different outputs or by making outputs of the pumping sources externally-controllable or by using self-controllable pumping sources.

According to a fourth aspect of the present invention, in the optical amplifier according to any one of the first to third aspect, a plurality of pumping sources are used in the pumping source unit so that, if any pumping source cannot emit predetermined output, such a pumping source can be replaced by a new one.

According to a fifth aspect of the present invention, in the optical amplifier according to any one of the first to fourth aspect, when it is assumed that a length of the substrate is L, a longer radius of the substrate is a, a distance between a center O and a focus F of the substrate is OF, a wavelength of optical signal is λ, a minimum spot size of the optical signal is w0, a maximum width of the amplifying medium 3 is 2r, and a relationship between the minimum spot size w0 of the optical signal and the maximum width 2r of the amplifying medium 3 is w0=r, the substrate and the amplifying medium is selected to satisfy the following relationship:

$$2\lambda \times (L/2)/\pi w0 \leq a-OF.$$

In an optical amplification apparatus according to the present invention, a lens collimating the optical signal to be incident on the amplifying medium is arranged in front of the optical signal input end face of the amplifying medium, whereby the optical signal is propagated through the amplifying medium not as a waveguide but as a propagating medium (light propagating path).

In an optical amplification method according to the present invention, the optical signal as free spatial light is propagated through the amplifying medium.

The amplifying medium in the said optical amplifier may be mainly formed from $SiO_2$-glass or crystal and, it is desirable that rare earth element is mixed therewith as amplifying medium. In this case, a cross-sectional area of the amplifying medium is sufficiently greater than that of the optical fiber not to establish high density even when the optical signal is amplified, thereby preventing the distortion property of the optical signal due to non-linear effect form being increased.

It is desirable that oscillation preventing treatment is applied to the input and output end faces of the amplifying medium of the said optical amplifier to prevent oscillation of the optical signal in the amplifying medium. In this case, since the optical signal is not oscillated within the amplifying medium, amplification is stably realized with high efficiency.

It is desirable that the input and output end faces of the amplifying medium of the said optical amplifier are inclined with respect to the optical signal transferring direction. In this case, the optical signal incident on the amplifying medium is not oscillated within the amplifying medium.

It is desirable that constituents of the substrate and the amplifying medium of the saida optical amplifier are adjusted and controlled so that there is no difference in index of refraction between them. In this case, loss of pumping efficiency due to influence of reflection and/or refraction does not occur at the interface between the substrate and the amplifying medium.

As the pumping source of the said optical amplifier, high output LD, multi-mode broad stripe LD, Master Oscillator Power Amplifier (MOPA) or LD array can be used. In this case, pumping ununiformity can be suppressed more minutely.

In order that the said optical amplifier can provide stable output without malfunction due to heat, it is desirable that the substrate is provided with a radiator mechanism.

It is desirable that the lens of the said optical amplification apparatus can change the optical signal to parallel light having extension substantially the same as a cross-sectional area of the amplifying medium to be incident on the latter. In this case, since the cross-sectional area of the amplifying medium can be utilized at the maximum, the non-linear effect due to increased in light power density is more hard to be occur.

BRIEF DESCRIPTION OF THE DRAWINGS

FIG. 3A is an explanatory view showing an example of a pumping source unit, FIG. 3B is a schematic view showing an illumination condition of pumping light in a section perpendicular to a propagating direction of optical signal, and FIG. 3C is a schematic view showing an illumination condition of the pumping light in a section parallel to the propagating direction of the optical signal;

FIGS. 4A and 4B are explanatory views showing another example of a pumping source unit;

BEST MODE FOR CARRYING OUT THE INVENTION

First Embodiment

Figure 1:
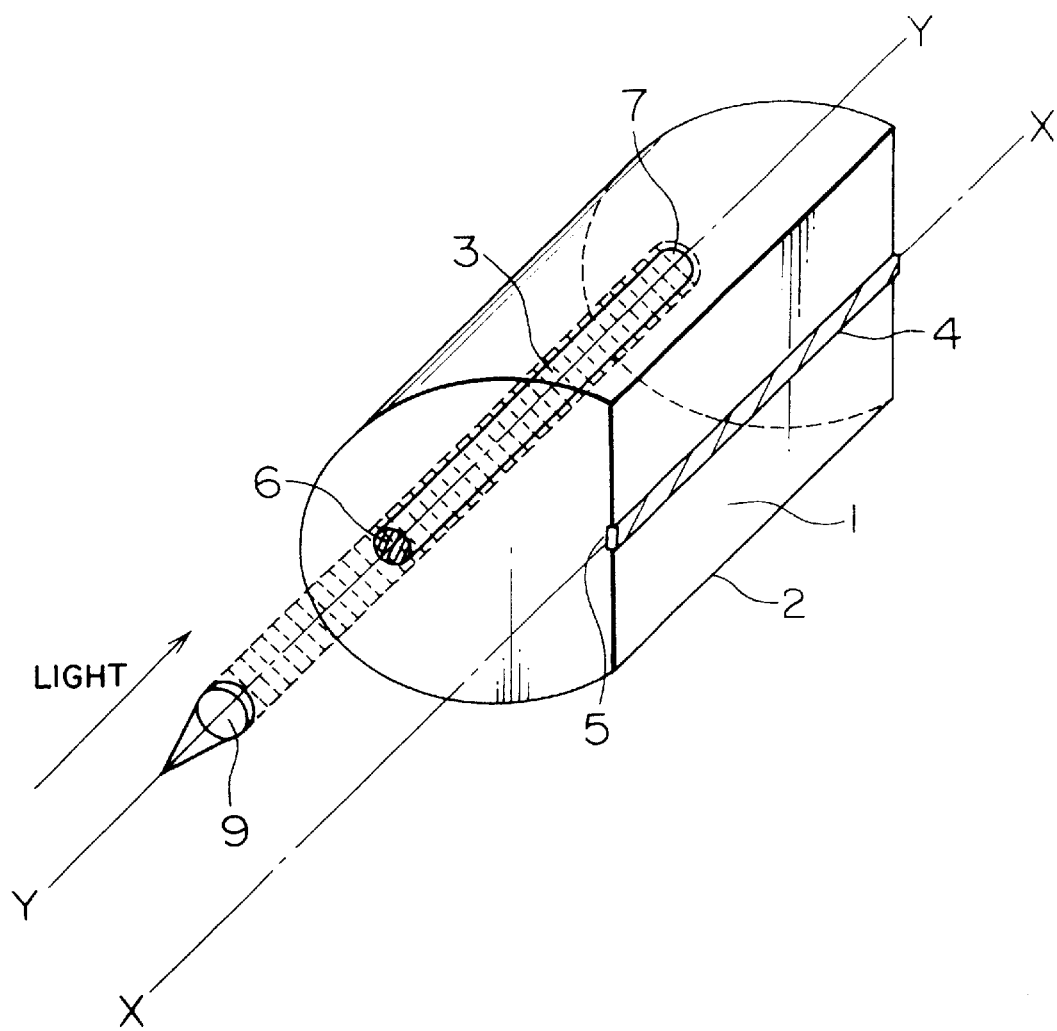
FIG. 1 is an explanatory view of an optical amplifier according to a first embodiment of the present invention.

An optical amplifier and an optical amplification apparatus according to a first embodiment of the present invention will be fully described with reference to FIG. 1 and FIGS. 3A to 3C. The optical amplifier comprises a substrate 2, an amplifying medium 3 and a pumping source unit 4, and the optical amplification apparatus includes the above-mentioned optical amplifier and a lens 9.

The said substrate 2 is provided with a surface (flat surface) 1 formed by cutting an elliptical cylinder mainly made of $SiO_2$-glass or crystal along a vertical plane including a focal axis X—X passing through one of foci of the elliptical cylinder and extending in an optical signal propagating direction. The flat surface 1 is mirror-finished, and gold-plating is applied to the flat surface to provide a reflection film or coating, and reflection coating is applied to surfaces (among outer surfaces of the substrate 2) other than a pumping light input inlet 5 and optical signal input and output end faces 6, 7 which are both end faces of the amplifying medium 3 so that the pumping light inputted from the pumping source unit 4 to the substrate 2 is prevented from leaking out of the substrate 2 and the pumping light which was not absorbed by the amplifying medium in one-pass is passed through the amplifying medium 3 again to be absorbed by the amplifying medium 3. Further, films capable of reflecting the pumping light and permitting passage of the optical signal are coated on the input and output end faces 6, 7 so that the pumping light cannot emit from the input and output end faces 6, 7 but only the optical signal can be inputted and outputted. Incidentally, the surface 1 is not limited to the flat surface but may be a curved surface.

The amplifying medium 3 shown in FIG. 1 is mainly made of SiO$_2$-glass or crystal and includes rare earth element such as erbium (Er), ytterbium (Yb) or neodymium (Nd) uniformly mixed as amplifying medium. Since a gain and an amplifying band of the amplifying medium 3 is changed by changing kind and/or density of the amplifying medium, the rare earth element to be mixed is selected among the above-mentioned rare earth element to obtain the required gain and amplifying band. The amplifying medium 3 has a cylindrical rod shape. The amplifying medium is positioned on a focal axis Y—Y passing through the other focus of the substrate 2 and extending in the optical signal propagating direction, and the input and output end faces 6, 7 of the amplifying medium are inclined with respect to the optical signal propagating direction (shown by the arrow in FIG. 1) to prevent oscillation of the optical signal within the amplifying medium 3. In order to prevent the oscillation of the optical signal, in place of the fact that the input and output end faces 6, 7 of the amplifying medium 3 are inclined, films for preventing oscillation may be adhered to or substance for preventing oscillation may be coated on the input and output end faces 6, 7.

When the pumping light intensity is same, the greater the diameter of the amplifying medium 3 the greater the amount of the pumping light absorbed whenever the pumping light is passed once. However, if the diameter of the amplifying medium is too great, the entire amplifying medium 3 cannot be pumped fully, thereby causing pumping ununiformity. Further, if the density of the amplifying medium is too great, there will arise difference in pumping density between the pumping light input side and its back side, thereby causing pumping ununiformity, too. Accordingly, it is desirable that the diameter of the amplifying medium 3 and the density of the amplifying medium be set so that the pumping ununiformity is reduced as less as possible. Incidentally, the amplifying medium 3 may be formed from crystal such as ruby crystal having a light pumping function.

If there is difference in index of refraction between the substrate 2 and the amplifying medium 3, since loss of pumping efficiency is caused at the interface therebetween due to influence of reflection and/or refraction, germanium (Ge) having a function for increasing the index of refraction or fluorine having a function for decreasing the index of refraction is appropriately added to one or both of the substrate 2 and the amplifying medium 3 to adjust the index of refraction so that difference in index of refraction between the substrate 2 and the amplifying medium 3 is eliminated.

Figure 2A:
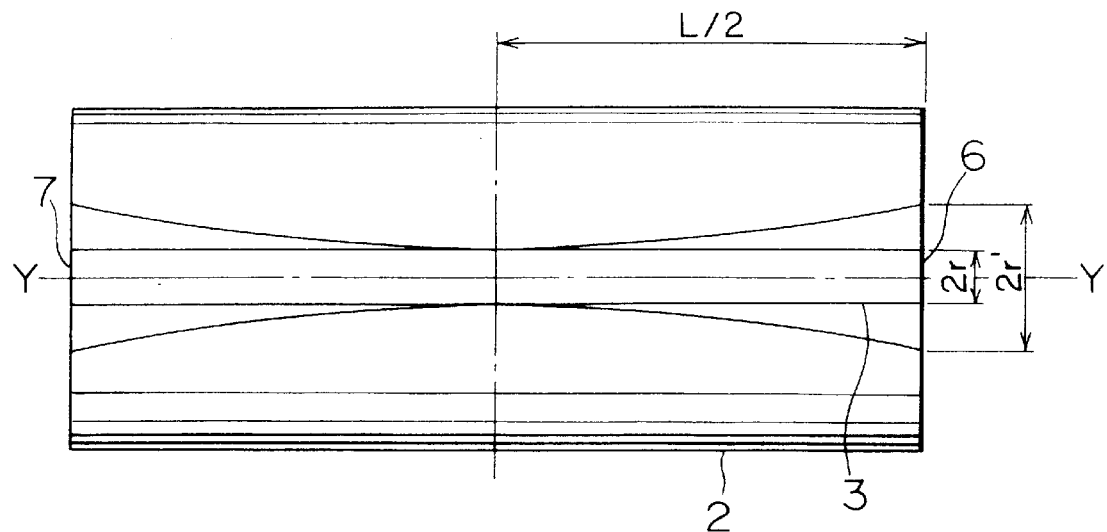
FIGS. 2A and 2B are explanatory views showing an optimum relationship between a substrate and an amplifying medium.
Figure 2B:
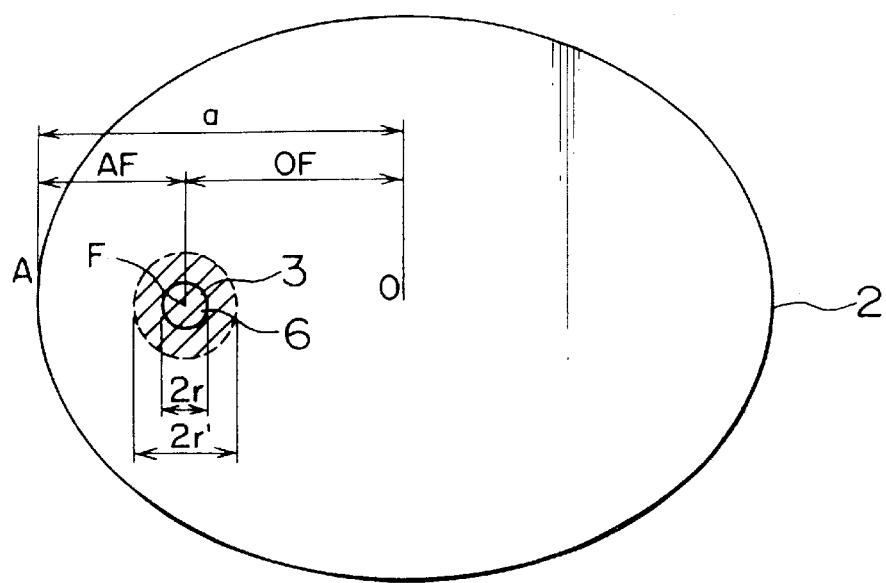

When the optical signal is Gaussian beams, even if the optical signal is changed to the parallel light by the lens 9, as shown in FIG. 2A, the light diameter is expanded in a hyperbolic fashion. Accordingly, a minimum distance between an outer peripheral surface of the amplifying medium 3 and the surface of the substrate 2 is selected to be greater than a radius of the maximum light diameter of the optical signal so that even the maximum diameter portion of the optical signal is included within the amplifying medium 3. More specifically, as shown in FIGS. 2A and 2B, when it is assumed that a length of the substrate 2 is L, a longer radius of the substrate is a, a distance between a center O and a focus F of the substrate is OF, a wavelength of the optical signal is $\lambda$, a minimum spot size of the optical signal is w0, a maximum width of the amplifying medium 3 is 2r, and a relationship between the minimum spot size w0 of the optical signal and the maximum width 2r of the amplifying medium 3 is w0=r, the following relationship is satisfied:

$$2\lambda \times (L/2)/\pi w0 \leq a-OF.$$

That is to say, it is selected so that the maximum radius of the Gaussian beam becomes smaller than a minimum distance AF between the focus F and the surface A of the substrate 2.

As shown in FIG. 3A, in the pumping source unit 4 of FIG. 1, a plurality of pumping sources 8 are disposed in two rows on both (upper and lower) sides of the focal axis X—X in the flat surface 1 of the substrate 2 and are arranged along the focal axis X—X so that, as shown in FIG. 3B, on the basis of a geometrical feature in which light emitted from a light source positioned on one of foci of an ellipse is always focused on the other focus, the pumping lights emitted from the respective pumping sources 8 are focused on the amplifying medium 3 positioned on the other focal axis Y—Y thereby to pump the amplifying medium 3 efficiently. Further, since the optical signal is amplified as it advances the propagating direction, it is required that, as the intensity of the optical signal is increased, the pumping density of the amplifying medium 3 be increased accordingly. To this end, in the illustrated embodiment, a distance between the adjacent pumping sources 8 is gradually decreased along the optical signal propagating direction as shown in FIG. 3A so that the pumping density of the amplifying medium 3 is gradually increased as shown in FIG. 3C.

In order to pump the amplifying medium 3 with high efficiency and without ununiformity, it is desirable that an aperture angle of each pumping source 8 can emit broad pumping light having high output, and, from this viewpoint, it is desirable that high output LD, multi-mode broad stripe LD, Master Oscillator Power Amplifier (MOPA) or LD array which was not used in the conventional optical amplifiers be used. By using such pumping sources 8, more minute control for pumping ununiformity can be achieved in comparison with a case where normal LD utilized in the conventional optical amplifiers is used. Further, in order to enhance the pumping efficiency, it is desirable that the aperture angle of each pumping light be varied with the maximum width of the amplifying medium 3 so that the pumping lights from the pumping sources are illuminated on the entire amplifying medium 3 along the width-wise direction thereof without excess and deficiency.

The lens 9 shown in FIG. 1 is disposed in front of the input end face 6 of the amplifying medium 3 so that the optical signal passed through the lens 9 is incident on the amplifying medium 3 as parallel light having the light diameter substantially the same as the diameter of the amplifying medium 3. Thus, unlike to a case where light is propagated in an ordinal waveguide, in which the light is propagated with total reflection, the optical signal incident on the amplifying medium 3 is propagated within the amplifying medium 3 and the surrounding substrate 2 as free spatial light not restrained at all. That is to say, the optical signal is propagated within the amplifying medium 3 and the surrounding substrate 2 not as a waveguide but as a mere propagating medium. Accordingly, unlike to the conventional optical amplifiers, the dimension of the amplifying medium is not limited in order to maintain the single mode of the optical signal, and, thus, the amplifying medium 3 can be designed with adequate dimension. In addition, since the great cross-sectional area of the amplifying medium 3 can be utilized at the maximum, the non-linear effect due to increase in light power density is very hard to occur.

Furthermore, by using the rod-shaped amplifying medium 3, the propagating distance can be shortened, thereby suppressing the non-linear effect.

Second Embodiment

Next, a second embodiment of the present invention will be explained with reference to FIGS. 4A and 4B. In this embodiment, arrangement of the pumping sources 8 is changed. More specifically, as shown in FIGS. 4A and 4B, a plurality of pumping sources 8 are equidistantly positioned on the focal axis X—X in a line.

Third Embodiment

Figure 5B:
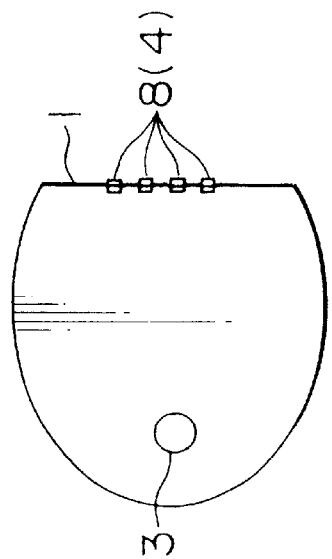
FIGS. 5A and 5B are explanatory views showing a further example of a pumping source unit.
Figure 5A:
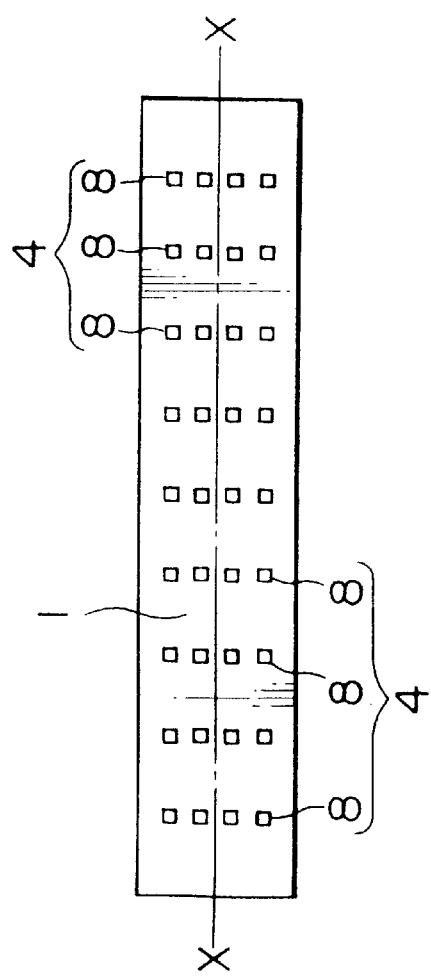

Next, a third embodiment of the present invention will be explained with reference to FIGS. 5A and 5B. In this embodiment, a number of pumping sources 8 are equidistantly positioned in two rows above the focal axis X—X and in two rows below the focal axis X—X, respectively (four rows in total).

Fourth Embodiment

Figure 6B:
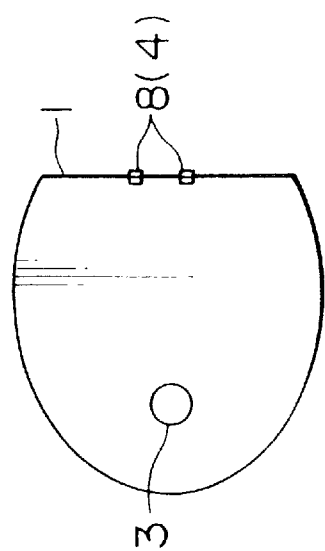
FIGS. 6A and 6B are explanatory views showing a still further example of a pumping source unit.
Figure 6A:
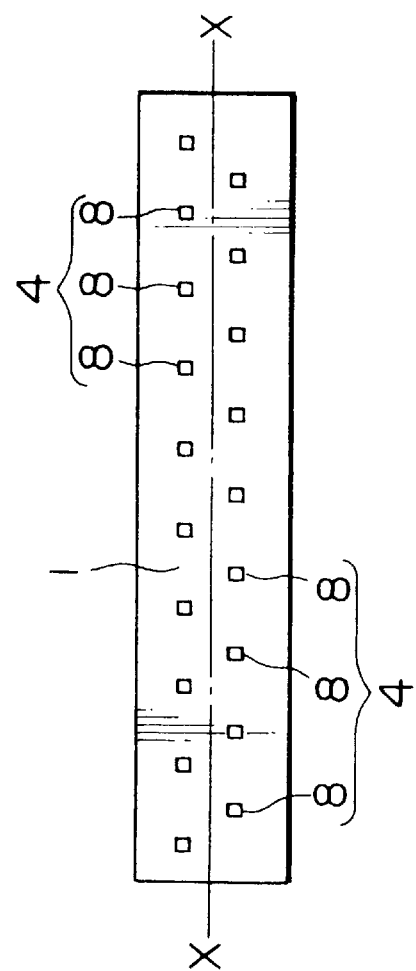

Next, a fourth embodiment of the present invention will be explained with reference to FIGS. 6A and 6B. In this embodiment, a number of pumping sources 8 are staggered with the interposition of the focal axis X—X along respective straight lines.

Fifth Embodiment

Figure 7B:
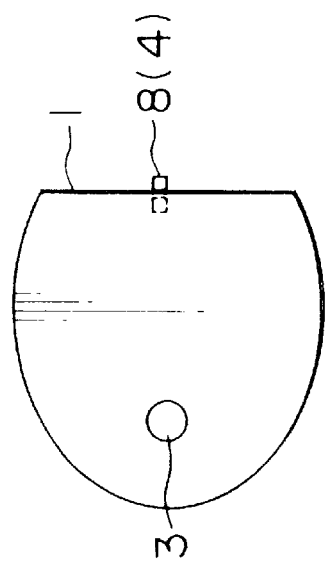
FIGS. 7A and 7B are explanatory views showing a further example of a pumping source unit.
Figure 7A:
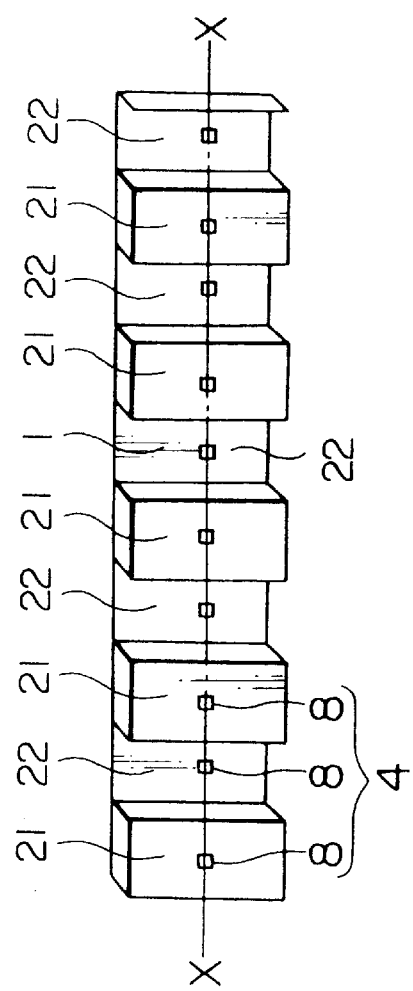

Next, a fifth embodiment of the present invention will be explained with reference to FIGS. 7A and 7B. In this embodiment, a number of pumping sources 8 are equidistantly positioned on the focal axis X—X, and the adjacent pumping sources 8 are staggered in a direction directing to the amplifying medium 3. To this end, in the illustrated embodiment, high portions 21 and low portions 22 are alternately provided on the flat surface 1 of the substrate 2 along the optical signal propagating direction, and the pumping sources 8 are disposed on the respective high and low portions 21, 22.

Sixth Embodiment

Figure 8B:
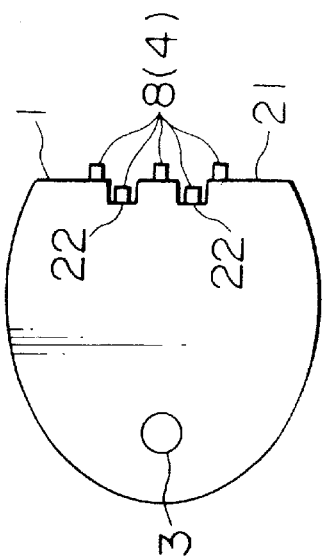
FIGS. 8A and 8B are explanatory views showing the other example of a pumping source unit.
Figure 8A:
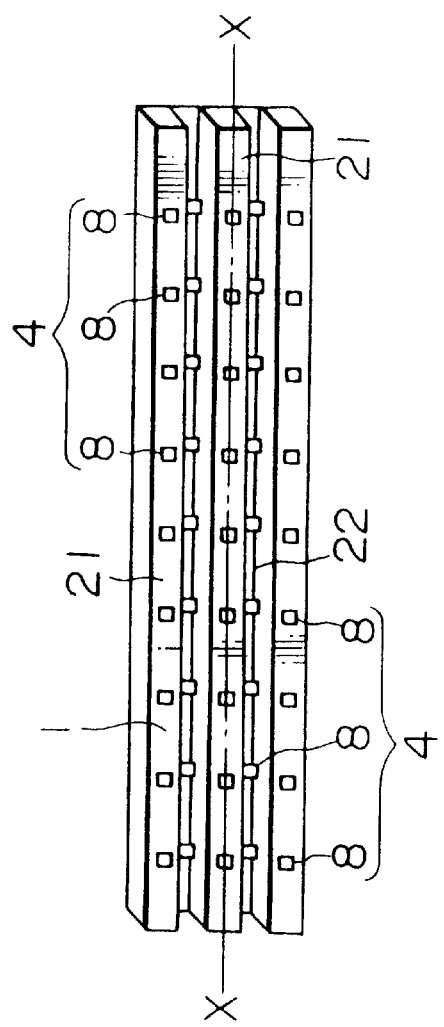
Figure 9A:
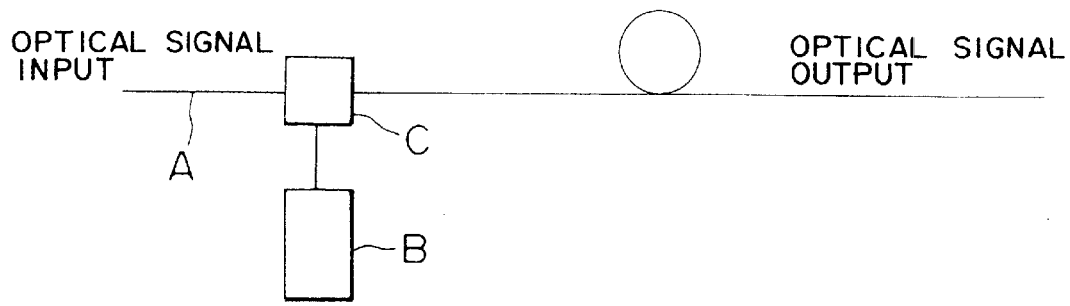
FIGS. 9A and 9B are explanatory views showing different examples of a conventional optical fiber amplifier.
Figure 9B:
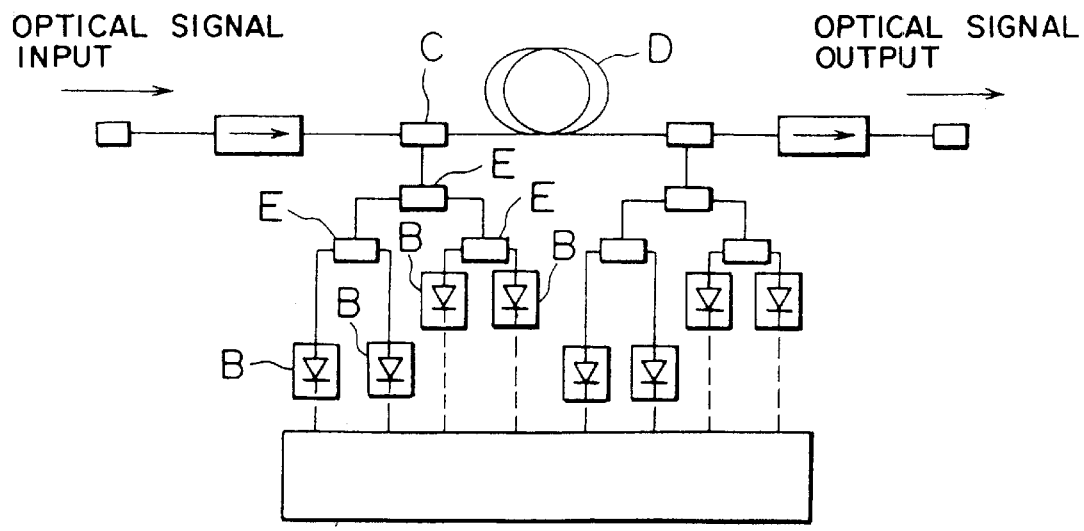
Figure 10:
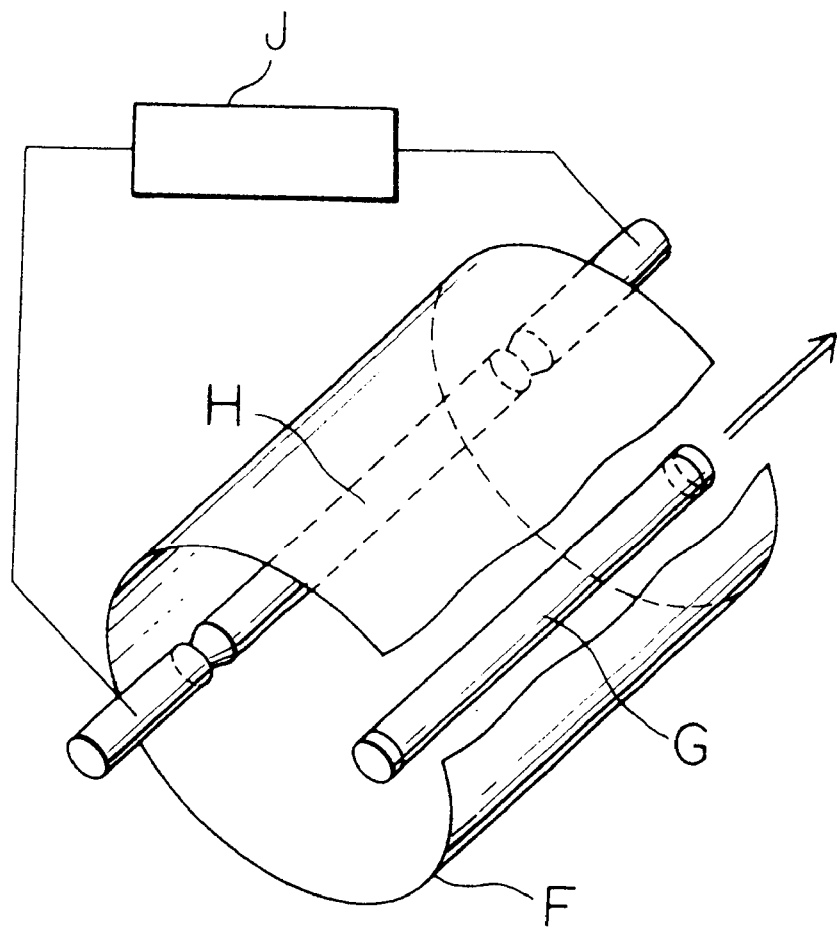
FIG. 10 is an explanatory view showing an example of a light collecting technique in a solid-state laser.

Next, a sixth embodiment of the present invention will be explained with reference to FIGS. 8A and 8B. In this embodiment, a number of pumping sources 8 are positioned on the focal axis X—X and above and below the focal axis, and, further, are staggered in a direction directing to the amplifying medium 3. To this end, in the illustrated embodiment, elongated high portions 21 and elongated low portions 22 are provided on the flat surface 1 of the substrate 2 alternately along an up-and-down direction, and the pumping sources 8 are disposed on the respective high and low portions 21, 22 and are staggered along the optical signal propagating direction.

Also in the second to sixth embodiments, the pumping density of the amplifying medium 3 is gradually increased from the optical signal input side toward the output side. To this end, pumping sources 8 having different output are used in such a manner that these pumping sources from one having the greatest output to one having the smallest output are arranged in order from the output side to the input side of the optical signal, or externally-controllable or self-controllable pumping sources including detector, feedback circuit, controlled unit are used and controlled in such a manner that outputs of these pumping source are gradually increased from the input side to the output side of the optical signal. Further, the row or rows of the pumping sources are not limited to the illustrated examples, two or more rows or a single row may be used, and the pumping sources may be arranged on the substrate not as chips but as an array. Further, regarding the arrangement of the pumping sources, any combination of the first to sixth embodiments may be used.

Seventh Embodiment

In the present invention, in order to permit replacement of any pumping source if performance of the pumping source 8 is deteriorated or the pumping source is damaged, it is desirable that the pumping sources 8 can easily be mounted on the substrate 2 detachably and can easily be re-positioned at the same positions.

In order to prevent poor operation of the optical amplifier due to the heat, the optical amplifier according to the present invention can be provided with a radiating mechanism. As the radiating mechanism, for example, radiator plates for increasing the surface area of the substrate 2 to facilitate radiation heat may be provided or cooling fluid may be circulated around the substrate 2 or a thermo-anchor or a heat pipe may be used for transferring from the substrate 2 to other site or any combination thereof may be used.

It is desirable that the substrate 2 be held on a fixed support to prevent the reflection coating on the substrate from being damaged. Further, it is desirable that the substrate has a structure in which radiation of heat is not prevented or the substrate be formed from material having excellent heat radiation.

Industrial Availability

The optical amplifier according to the first aspect of the present invention has the following advantages.

① Since the amplifying medium is disposed on or adjacent to one of the focal axes of the surface of the substrate obtained by cutting the elliptical cylinder or elliptical cone and the pumping source unit is disposed on or adjacent to the other focal axis, on the basis of a geometrical feature in which light emitted from a light source positioned on one of foci of an ellipse is always focused on the other focus thereof, the pumping lights are inputted to the amplifying medium efficiently.

② Since any number of pumping sources having any arrangement can be positioned, pumping ununiformity of the amplifying medium in the plane perpendicular to the optical signal propagating direction can be prevented, with the result that the pumping density of the amplifying medium can easily be adjusted in the optical signal propagating direction.

③ The pumping lights can be inputted to the amplifying medium with fewer parts and lesser energy, thereby achieving high output.

The optical amplifier according to the second aspect of the present invention has the following advantages.

① Since the reflection coating for reflecting pumping light is applied to the surfaces (among outer surfaces of the substrate) other than an pumping light input inlet and both end faces of the amplifying medium which are optical signal input and output end faces, the pumping light does not leak out of the substrate, thereby minimizing the energy loss.

② The pumping light which was not absorbed by the amplifying medium in one-pass is passed through the amplifying medium again to be absorbed.

③ Since the films capable of reflecting the pumping light and permitting passage of the optical signal are coated on the both end faces (optical signal input and output end faces) of the amplifying medium, the pumping light does not leak through the end faces.

The optical amplifier according to the third aspect of the present invention has the following advantage.

① Since the pumping source unit can be controlled to adjust the pumping density of the amplifying medium, the pumping density can be increased as the optical signal is amplified.

The optical amplifier according to the fourth aspect of the present invention has the following advantage.

① In the pumping source unit, since, if any pumping source cannot emit predetermined output, such an pumping source can be replaced by a new one, the stable output can always be obtained and the service life of the amplifier can be extended.

The optical amplifier according to the fifth aspect of the present invention has the following advantage.

① When it is assumed that a length of the substrate is L, a longer radius of the substrate is a, a distance between a center O and a focus F of the substrate is OF, a wavelength of optical signal is $\lambda$, a minimum spot size of the optical signal is w0, a maximum width of the amplifying medium is 2r, and a relationship between the minimum spot size w0 of the optical signal and the maximum width 2r of the amplifying medium is w0=r, since the substrate and the amplifying medium is selected to satisfy the relationship "$2\lambda \times (L/2)/\pi w0 \leq a - OF$", there is the space for permeating the optical signal around the amplifying medium, thereby amplifying the optical signal efficiently.

The optical amplification apparatus according to the present invention has the following advantage, since there is provided the lens collimating the optical signal to be incident on the amplifying medium.

① Unlike to the conventional optical amplifiers, since the dimension of the amplifying medium is not limited in order to maintain the single mode of the optical signal and thus the amplifying medium can be designed with adequate dimension, the non-linear effect due to increase in light power density is very hard to occur. Further, by using the rod-shaped amplifying medium, the propagating distance can be shortened, thereby suppressing the non-linear effect.

The optical amplification method according to the present invention has the following advantage.

① Since the optical signal as the free spatial light is propagating through the amplifying medium, the magnitude of the waveguide is not limited to maintain the single mode of the optical signal, with the result that the non-linear effect due to increase in light power density is hard to occur.

What is claimed is:

1. An optical amplifier comprising:

surface disposed on a substrate of an elliptical cylinder or cone which is mainly made of $SiO_2$-glass or crystal, the surface being disposed on or adjacent to a focal axis passing through one of foci of the substrate and extending in an optical signal propagating direction;

an amplifying medium disposed on or adjacent to another focal axis of said substrate;

a pumping source unit disposed on or adjacent to the surface of the substrate; and a pumping source of said pumping source unit being a semiconductor laser and said surface being a sectional surface formed by excising a part of the elliptical cylinder or cone on or adjacent to said focal axis, wherein, when it is assumed that a length of said substrate is (L), a longer radius of said substrate is (a), a distance between a center (O) and a focus (F) of said substrate is (OF), a wavelength of optical signal is ($\lambda$), a minimum spot size of the optical signal is (w0), a maximum width of said amplifying medium is (2r), and a relationship between the minimum spot size (w0) of the optical signal and the maximum width (2r) of said amplifying medium is w0=r, said substrate and said amplifying medium are selected to satisfy the following relationship:

$$2\lambda \times (L/2)/\pi W0 \leq a - OF.$$

2. An optical amplifier comprising:

a surface disposed on a substrate of an elliptical cylinder or cone which is mainly made of $SiO_2$-glass or crystal, the surface being disposed on or adjacent to a focal axis passing through one of foci of the substrate and extending in an optical signal propagating direction;

an amplifying medium disposed on or adjacent to another focal axis of said substrate;

a pumping source unit disposed on or adjacent to the surface of the substrate; and a pumping source of said pumping source unit being a semiconductor laser and said surface being a sectional surface formed by excising a part of the elliptical cylinder or cone on or adjacent to said focal axis, wherein a lens for collimating optical signal to be incident on said amplifying medium is arranged in front of the optical signal input end face of said amplifying medium, whereby the optical signal is propagated through said amplifying medium not as a waveguide but as a propagating medium.

* * * * *